Figure 1:
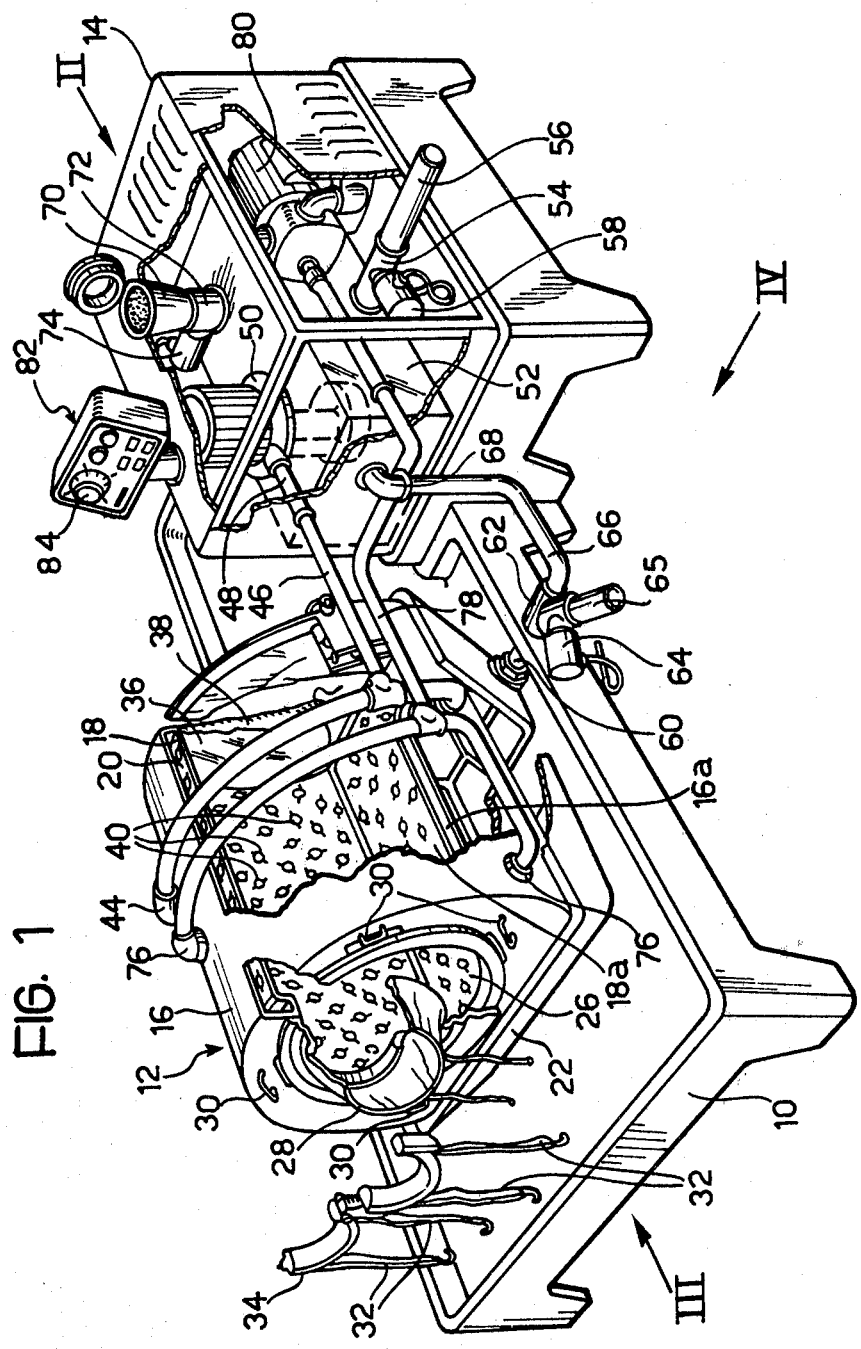

United States Patent [19]

Altissimo

[11] 4,382,424
[45] May 10, 1983

[54] AUTOMATIC APPARATUS FOR CLEANING DOGS AND SIMILAR ANIMALS

[75] Inventor: Mario Altissimo, Turin, Italy
[73] Assignee: Hogar S.r.l., Turin, Italy
[21] Appl. No.: 325,477
[22] Filed: Nov. 27, 1981
[51] Int. Cl.³ .............................................. A01K 13/00
[52] U.S. Cl. ..................................................... 119/158
[58] Field of Search ............................ 119/158, 160, 1

[56] References Cited

U.S. PATENT DOCUMENTS

| 3,884,191 | 5/1975 | Stout | 119/158 |
| 4,057,032 | 11/1977 | Dimitriadis | 119/1 |
| 4,165,714 | 8/1979 | Weissmar et al. | 119/158 |

*Primary Examiner*—Hugh R. Chamblee
*Attorney, Agent, or Firm*—Sughrue, Mion, Zinn, Macpeak and Seas

[57] ABSTRACT

Apparatus for washing dogs and similar animals comprising a substantially cylindrical casing having a flat bottom wall, a portion which can be opened to allow an animal to enter and to leave the casing, and a vertical end wall formed with an aperture for the head of the animal positioned inside the casing. The casing is provided internally with a plurality of spray nozzles to which water or a mixture of water and detergent under pressure is supplied through supply means. A central programming and control unit controls in accordance with a predetermined operational washing cycle, the supply means and discharge means for discharging to the exterior of the casing the water or the mixture coming from the spray nozzles.

9 Claims, 8 Drawing Figures

U.S. Patent May 10, 1983 Sheet 1 of 4 4,382,424

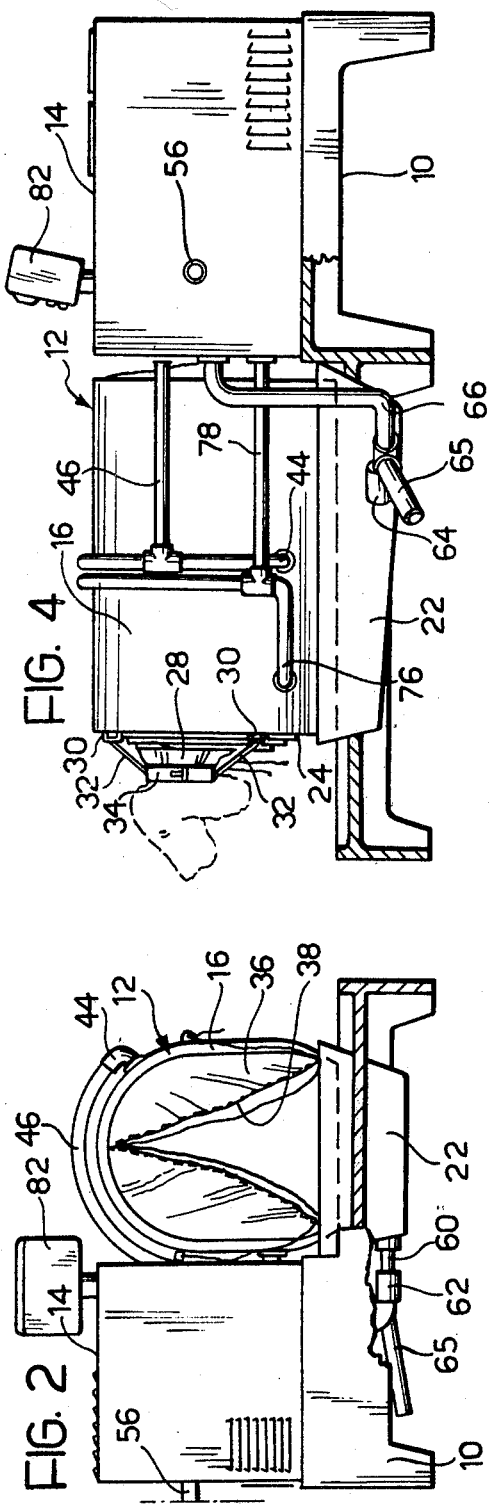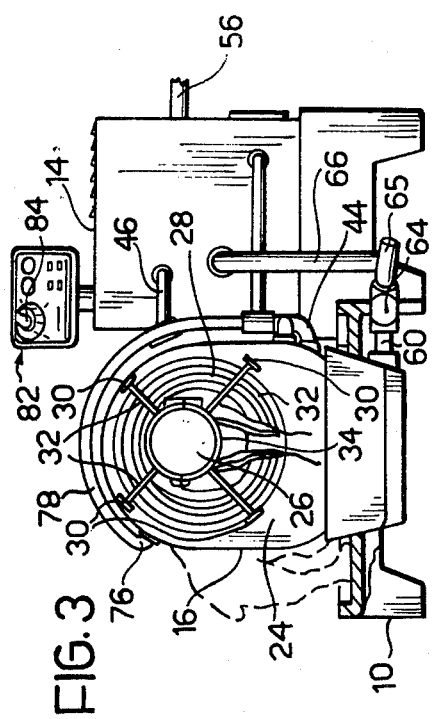

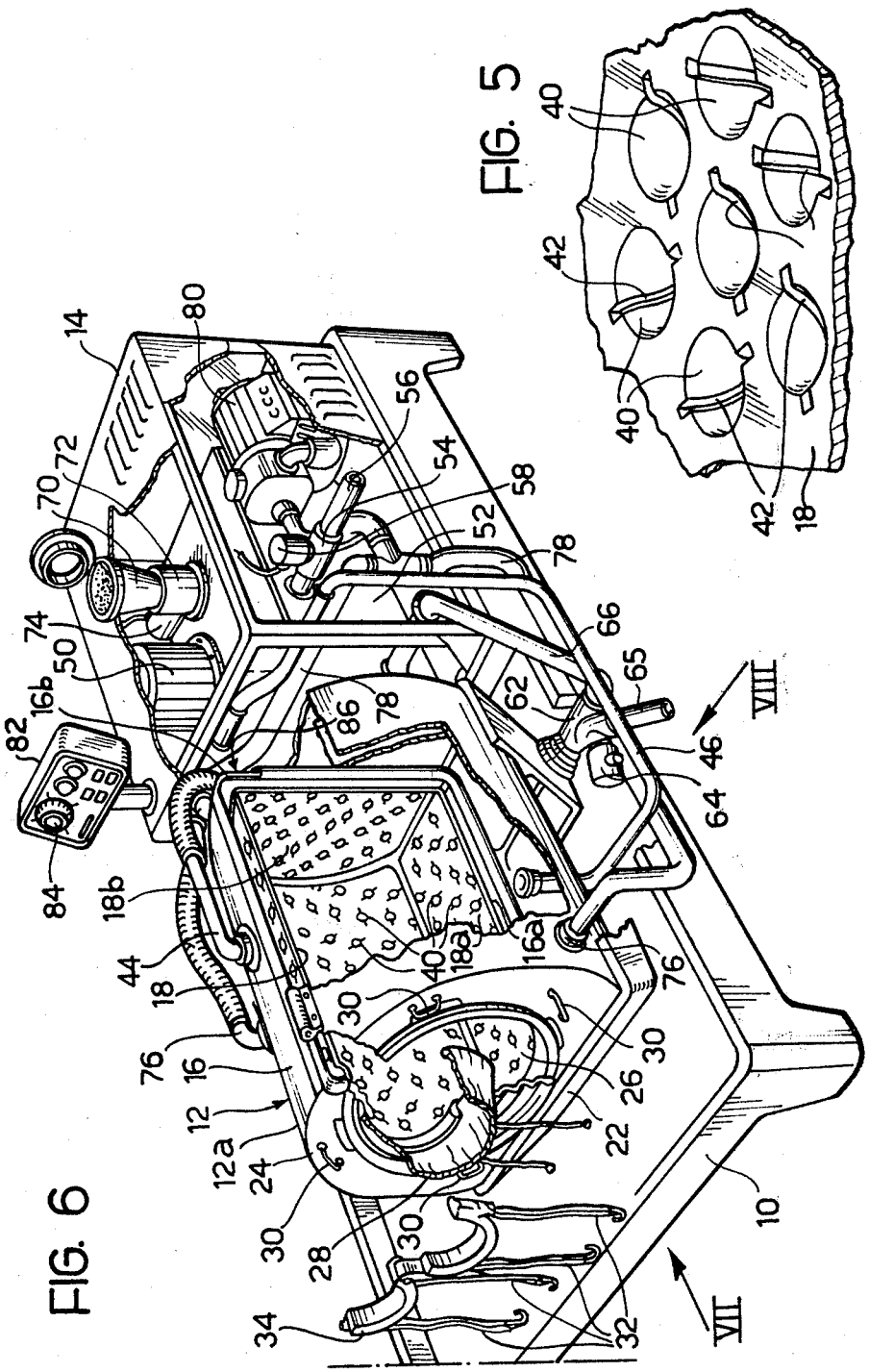

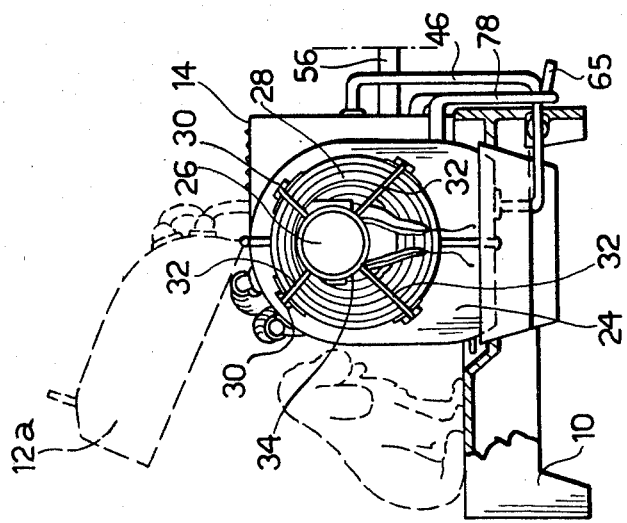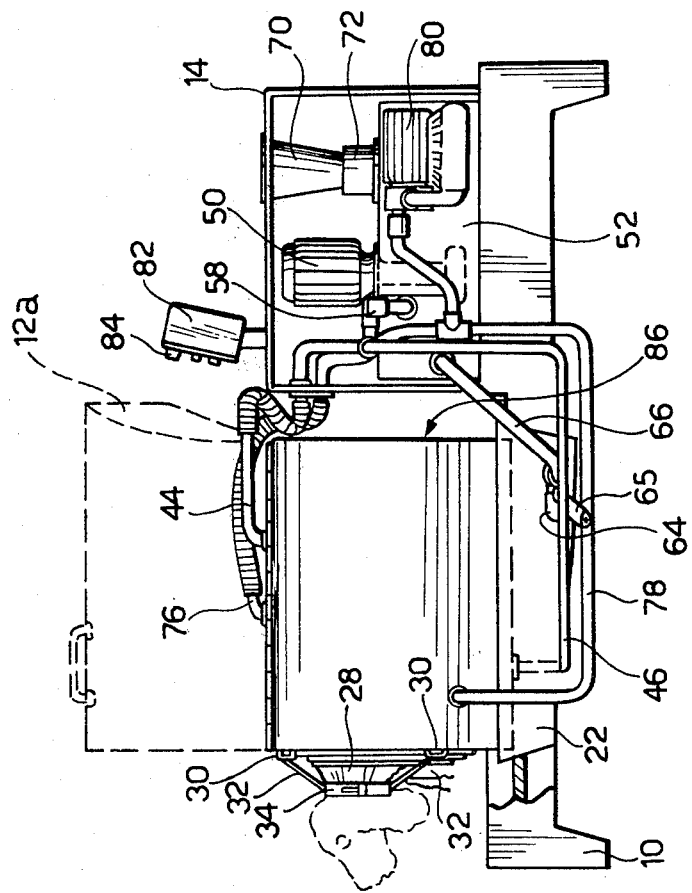

AUTOMATIC APPARATUS FOR CLEANING DOGS AND SIMILAR ANIMALS

The present invention relates to apparatus for washing dogs and similar animals, which allows the operations which are usually carried out manually to be mechanised in a completely automatic manner.

The apparatus according to the invention is characterised in that it comprises:

a substantially cylindrical casing disposed with its axis horizontal and provided with a flat, bottom wall, a portion which can be opened to allow an animal to enter and to leave the casing, and a vertical end wall formed with an aperture for the head of an animal positioned, in use, inside the casing, the said aperture being provided around its edge with means for firmly encompassing the neck of the animal; the casing being provided internally, furthermore, with a plurality of spray nozzles directed towards the interior of the said casing.

supply means for supplying water, or a mixture of water and detergent, under pressure to the said spray nozzles, discharge means for discharging to the exterior of the casing the water or the mixture of water and detergent coming from the spray nozzles, and a central programming and control unit for controlling the said supply means and the said discharge means in accordance with a predetermined operational washing cycle.

Due to this characteristic, the apparatus according to the invention enables dogs and similar animals to be washed rapidly, safely and efficiently without requiring any normal intervention on the part of specialised personnel.

According to the invention, the spray nozzles are so orientated that, in use, the jet coming out of each nozzle overlaps with the jets of the adjacent nozzles. In this manner it is possible to obtain a uniform distribution of the sprayed liquid over the entire body of the animal placed inside the casing.

Preferably, the spray nozzles each have an outlet opening of a flattened section.

The apparatus according to the invention further comprises supply means for supplying hot air under pressure to the said spray nozzles, the said air supply means being controlled by the said central programming and control unit to effect a drying cycle at the end of the wash cycle.

According to a particularly advantageous characteristic of the invention the casing has an external wall and an internal wall which together define a peripheral interspace, and the spray nozzles are arranged on the internal wall in communication with the said interspace, the external wall being provided with at least one first input connection and with at least one output aperture which communicate with the said interspace and are respectively connected to the said water supply means and to the said discharge means, and with at least one second input connection communicating with the said interspace and connected to the said air supply means.

The spray nozzles advantageously comprise impressions in the form of circular indentations made in the surface of the internal wall of the casing by pressing, each impression having an elongate diametral slit forming the outlet openning of the spray nozzle.

Due to this characteristic, the apparatus according to the invention is of particularly simple, strong and economic construction.

The invention will now be described in detail with reference to the appended drawings, which are supplied purely by way of non-limitative example, in which:

FIG. 1 is a partially sectioned, diagrammatic, perspective view of apparatus according to the invention, FIG. 2 is a partially sectioned, diagrammatic elevational view in the direction of arrow II of FIG. 1, FIG. 3 is a partially sectioned, diagrammatic, elevational view in the direction of arrow III of FIG. 1, FIG. 4 is a partially sectioned, diagrammatic, elevational view in the direction of arrow IV of FIG. 1, FIG. 5 is a fragmentary perspective view to an enlarged scale of a detail of FIG. 1, FIG. 6 is a perspective view similar to FIG. 1 showing a variant of the apparatus according to the invention, FIG. 7 is a partially sectioned, diagrammatic, elevational view in the direction of the arrow VII of FIG. 6, and FIG. 8 is a partially sectioned, diagrammatic, elevational view, according to the arrow VIII of FIG. 6.

In the embodiment of the apparatus shown in FIGS. 1 to 4, a support bed 10 carries a substantially cylindrical casing 12 with its axis horizontal, and a casing 14 in the form of a cabinet.

The side wall of the cylindrical casing 12 comprises an external wall 16 and an internal wall 18 spaced from each other in such a way as to define a peripheral interspace 20. In correspondence with the lower part of the casing 12, the two walls 16 and 18 both have a flat base part 16a, 18a. The flat part 16a of the external wall 16 communicates, through apertures not visible in the drawing, with the interior of a collection tank 22 which has a sloping base and rests on the bed 10. The edge of the tank surrounds the lower part of the casing 12.

One of the vertical end walls of the casing 12, indicated by 24, is provided with a circular aperture 26 around the edge of which are secured annular bellows of elastomer material 28. Four supports in the form of handles 30 are also secured to the wall 24 and serve to anchor four elastic belts 32. These belts 32 are attached to a collar 34 which may be opened and adjusted and which, in use, is intended to surround the neck of an animal placed inside the casing 12.

The other end wall 36 of the casing 12 comprises a flexible sheet, for example, of elastomer material, which is centrally provided with a zip fastener 38, designed to allow the animal to enter and to leave the casing 12.

The internal wall 18 of the casing 12 is provided over its entire surface with equispaced impressions in the form of circular indentations 40 made by pressing. Each indentation 40 has, in correspondence with its base, an elongate diametral slit 42 which at its ends extends beyond the edge of the said indentation. As can be clearly seen in FIG. 5, the slits 42 of adjacent indentations 40 have different orientations.

The indentations 40 form a plurality of spray nozzles the outlet openings of which are constituted by the slits 42, and have a flattened section.

The spray nozzles may have a form different from that shown and be provided, for example, on a tubular coil or on piping arranged inside the casing 12. However, the arrangement described above is extremely advantageous both from the point of view of simplicity of construction and that of operational efficiency.

The external wall 16 of the casing 12 is provided with a pair of first input connections 44 which are respectively disposed in the upper zone and the lower zone of the casing 12. The connections 44 open into the interspace 20 and are connected, by means of a delivery pipe 46, to the output 48 of an electric pump 50 associated with a receptacle 52 housed inside the casing 14. The receptacle 52 is provided with a first input connection 54 which may be connected by a supply pipe 56 to a water supply not shown. An on/off electrovalve 58 is located in the first input connection 54.

The sloping base of the collection tank 22, which, as previously explained, is in communication with the lower part of the interspace 20 of the casing 12, is provided with a discharge connection 60. This discharge connection 60 is connected by means of a two-way connector 62, to a first and to a second discharge duct 65 and 66 respectively. A change-over electrovalve 64 is located in the connector 62. The first discharge duct 65 leads to a drain situated externally of the apparatus, whilst the second discharge duct 66 is connected to a second input connection 68 of the receptacle 52.

A container 70 in the form of a hopper for containing detergent, is fixed onto the upper part of the receptacle 52. The container 70 communicates with the inside of the receptacle 52 through a pipe 72 into which there is inserted a regulating electrovalve 74.

The external wall 16 of the casing 12 is also provided with a pair of second input connections 76 communicating with the interspace 20 and connected, by means of a delivery duct 78, with a hot air generator 80 of conventional type, housed inside the casing 14.

The electric pump 50, the on/off electrovalve 58, the change-over electrovalve 64, the regulating electrovalve 74 and the hot air generator 80 are electrically connected to a central programming and control unit 82 secured to the upper part of the housing 14. The active components of the central unit 82 may comprise electric or electronic circuits of the conventional type controlled by means of a programmable timer 84 and arranged to control the various components of the apparatus connected to the central unit 82, in a semi- or fully automatic manner in accordance with a pre-established operating cycle.

The operation of the apparatus of the invention is as follows.

In order to enable an animal which is to be cleaned to enter the casing 12, it is necessary to undo the zip fastener 38 in the flexible wall 36 of the casing 12, as shown in FIG. 2. The animal is then pushed towards the end wall 24 until its head enters the aperture 26. In this position, the bellows 28 of elastomer material close around the surface of the animal's neck, encompassing it tightly. To hold the animal in this position it is sufficient to fasten the collar 34 around the neck of the animal and anchor the belts 32 to their respective supports 30, as indicated in FIG. 4.

When the zip 38 has been done up again, the cleaning cycle may be started by operation of the controls of the central unit 82.

The operational cycle of the machine, which may be programmed by means of the timer 84 of the central unit 82, preferably comprises the following successive phases: pre-wash, wash, rinse and drying.

During the pre-wash phase, the receptacle 52 is filled initially with water from the supply pipe 56. At the end of this filling operation, the on/off valve 58 is closed and the electric pump 50 is operated to draw up water from the receptacle 52 and feed it under pressure through the delivery pipe 46, to the input connections 44 of the casing 12. At the same time, the regulating valve 64 opens to allow a predetermined quantity of detergent to be supplied from the container 70 into the receptacle 52.

The mixture of water and detergent supplied to the input connections 44 passes into the interspace 20 of the casing 12 and is distributed to the various spray nozzles 40. In order to achieve a more uniform distribution of the liquid, two flow distributors, not shown in the drawings, can advantageously be associated with the input connections 44, these flow distributors comprising, for example, conical diffusers housed inside the interspace 20.

The liquid mixture is then delivered through the spray nozzles 40 into the interior of the casing 12, against the body of the animal to be cleaned. The particular form of the nozzles 40 and the orientation of their respective outlet openings 42 described above, allows a series of flattened jets to be obtained which interfere with each other in the immediate vicinity of the internal wall 18 of the casing 12. This makes it possible to achieve a uniform diffusion of the liquid and to produce an efficient hydro-massage action on the body of the animal during cleaning.

The liquid ejected from the spray nozzles 40 collects in the lower part of the casing 12 and is discharged into the collection tank 22. Due to the inclination of the base of the collection tank 22, the liquid gravitates towards the discharge connection 60. During the prewash phase, the change-over valve 64 is set in such a position that it interrupts flow through the first discharge duct 65. The liquid can therefore flow only through the second discharge duct 66 to return to the inside of the receptacle 52. The pre-wash phase is therefore effected in a closed circuit using the same liquid all the time.

At the end of the pre-wash phase, the change-over valve 65 is set in such a position that it interrupts flow through the second discharge duct 66, forcing the liquid to be discharged to the exterior of the collection tank 22 through the first discharge duct 65.

At the end of this discharge, the wash phase begins and is carried out in exactly the same manner as the prewash phase.

At the end of this phase, the rinse phase begins, this phase being effected in an open cycle, with the on/off valve 58 being open, and the change-over valve 64 positioned for discharging through the first discharge duct 65. The regulating valve 74 is maintained permanently closed, so as to prevent the introduction of detergent into the receptacle 52.

At the end of the rinse phase, the electric pump 50 stops and the hot air generator 80 is activated.

This generator 80 is arranged to supply hot air under pressure to the spray nozzles 40 through the delivery pipe 78 and the input connections 76. During this drying phase, the zip fastener 38 of the flexible wall 36 of the casing 12 is preferably in its open position, in order to allow the air to escape out of the casing 12. At the end of the drying operation, the animal is removed from the casing 12, after the collar 34 has been opened.

The variant of the apparatus shown in FIGS. 6 to 8 is, in general, similar to the one shown in FIGS. 1 to 4, and only the differences will be described in detail with the same reference numerals being used for identical or similar parts.

In this variant, the back wall 86 of the casing 12, opposite the wall 24, is rigid and comprises two substantially vertical sections 16b, 18b of the external wall 16 and the internal wall 18. To enable an animal to enter and leave the casing 12, a portion 12a of the side wall of this casing 12 is hinged to the remaining portion, so as to form a door which may be swung up into the position shown by a dashed line in FIGS. 7 and 8. Sealing means are of course provided in the areas of meeting of the door 12a and the rest of the casing 12, these means comprising, for example, a gasket of elastomer material.

The operation of the apparatus shown in FIGS. 6 to 8 is the same as that described with reference to FIGS. 1 to 4.

From the above it is clear that the apparatus of the invention enables the washing and subsequent drying of dogs and similar animals to be carried out in a totally automatic and programmed manner without requiring any manual intervention on the part of specialised personnel.

I claim:

1. Automatic apparatus for washing dogs and similar animals, comprising:
   a substantially cylindrical casing disposed with its axis horizontal and provided with a flat, bottom wall, a portion which can be opened to allow an animal to enter and to leave the casing, and a vertical end wall formed with an aperture for the head of an animal positioned, in use, inside the casing, said aperture being provided around its edge with means for firmly encompassing the neck of the animal; the casing being provided internally with a plurality of spray nozzles directed towards the interior of said casing;
   supply means for supplying water, or a mixture of water and detergent, under pressure to said spray nozzles;
   discharge means for discharging to the exterior of the casing the water or the mixture of water and detergent coming from the spray nozzles;
   a central programming and control unit for controlling said supply means and said discharge means in accordance with predetermined operational washing cycle;
   supply means for supplying hot air under pressure to said spray nozzles, said air supply means being controlled by said central programming and control unit to effect a drying cycle at the end of the washing cycle;
   wherein said casing has an external wall and an internal wall which together define a peripheral interspace with spray nozzles being arranged on the internal wall in communication with said interspace, said external wall being provided with at least one first input connection and with at least one output aperture communicating with said interspace and respectively connected to said water supply means and to said discharge means and with at least one second input connection communicating with said interspace and connected to said air supply means; and
   wherein the spray nozzles comprise impressions in the form of circular indentations made in the surface of the internal wall of the casing by pressing with each impression having an elongate diametral slit forming the outlet opening of the spray nozzle.

2. Apparatus according to claim 1, wherein the said water supply means and the said discharge means comprise:
   a receptacle having a first input connection which is connectable by means of a supply pipe to a water supply, and a delivery connection connected by means of a delivery pipe with the or each first input connection of the casing,
   a container for detergent connected to the said receptacle,
   a pump arranged to draw water, or a mixture of water and detergent, from the receptacle and to feed it under pressure to the delivery pipe,
   first valve means for controlling flow through the supply pipe,
   a tank for collecting the water or of the mixture of water and detergent, the collection tank being arranged beneath the casing in communication with the or each output aperture of the said casing and being provided with a discharge connection connected to a first discharge duct and, through a second discharge duct derived from the first discharge duct, to a second input connection of the said receptacle,
   second valve means for controlling flow through the first discharge duct and through the second discharge duct, and
   third valve means for controlling the passage of detergent from the container for the detergent to the receptacle; the said first, second and third valve means and the said pump being controlled by the said central programming and control unit.

3. Apparatus according to claim 1, wherein the said air supply means comprise a hot air generator connected, by means of a delivery duct, with the or each second input connection of the casing.

4. Apparatus according to claim 1 wherein a portion of the side wall of the casing is hinged to the remainder of the casing so as to form a door for the entry and exit of the animal.

5. Apparatus according to claim 1 wherein the end wall of the casing opposite the one provided with the aperture for the head of the animal comprises a flexible sheet centrally provided with a zip fastener for the entry and exit of the animal.

6. Apparatus according to claim 1, further comprising an openable collar which, in use, can be placed around the neck of the animal; the said collar being securable by anchorage means to the said end wall of the casing provided with the aperture for the head of the animal.

7. Apparatus according to claim 1 wherein the central programming and control unit incorporates a programmable timer.

8. Apparatus according to claim 1, wherein the spray nozzles are so orientated that, in use, the jet coming out of each nozzle overlaps with the jets of the adjacent nozzles.

9. Apparatus according to claim 8, wherein the spray nozzles each have an outlet opening of flattened section.

* * * * *